United States Patent
Takahara

(10) Patent No.: US 9,067,369 B2
(45) Date of Patent: *Jun. 30, 2015

(54) TIRE PUNCTURE SEALANT

(75) Inventor: Hideyuki Takahara, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/576,555

(22) PCT Filed: Feb. 3, 2011

(86) PCT No.: PCT/JP2011/052279
§ 371 (c)(1),
(2), (4) Date: Aug. 16, 2012

(87) PCT Pub. No.: WO2011/096491
PCT Pub. Date: Aug. 11, 2011

(65) Prior Publication Data
US 2012/0309867 A1 Dec. 6, 2012

(30) Foreign Application Priority Data

Feb. 4, 2010 (JP) .................. 2010-023133
Feb. 2, 2011 (JP) .................. 2011-020780

(51) Int. Cl.
*B29C 73/00* (2006.01)
*B29C 73/16* (2006.01)
*B29L 30/00* (2006.01)

(52) U.S. Cl.
CPC ........... *B29C 73/163* (2013.01); *B29L 2030/00* (2013.01)

(58) Field of Classification Search
USPC ........................................................ 523/166
See application file for complete search history.

(56) References Cited

U.S. PATENT DOCUMENTS 6,864,305 B2 *  3/2005  Kishida et al. ................ 524/386
6,992,119 B2 *  1/2006  Kojima et al. ................ 523/166
8,148,448 B2 *  4/2012  Takahara et al. ............. 523/166
2009/0023837 A1 *  1/2009  Okamatsu et al. ........... 523/166
2011/0144237 A1    6/2011  Takahara et al.

FOREIGN PATENT DOCUMENTS

| DE | 196 52 546 A1 | 6/1998 |
| DE | 10 2010 030 320 A1 | 12/2011 |
| EP | 0 867 494 A2 | 9/1998 |
| EP | 0867494 A2 * | 9/1998 |
| JP | 2000-272022 A | 10/2000 |
| JP | 2006-111726 A | 4/2006 |
| JP | 2006-188621 A | 7/2006 |

OTHER PUBLICATIONS

"Polymer Handbook", 4'th edition, Brandrup et al ed., VI-199 (1999).*
Datenblatt "Polyethylacrylat", recherchiert unter http:www.sigmaaldrich.com/catalog/product/.
Datenblatt "Polybutylacrylat", recherchiert unter http:www.sigmaaldrich.com/catalog/product/aldrich/.
DE Office Action issued to the corresponding DE Patent Application No. 11 2011 100 453.2 with partial English translation thereof, received Dec. 10, 2013.

* cited by examiner

*Primary Examiner* — Edward Cain
(74) *Attorney, Agent, or Firm* — Carrier Blackman & Associates, P.C.; Joseph P. Carrier; William D. Blackman

(57) ABSTRACT

An object of the present invention is to provide a tire puncture sealant whereby both sealing performance and storage performance can be achieved. A tire puncture sealant is provided that includes a natural rubber latex, an antifreezing agent, and an acrylic emulsion. A mass ratio of a solid content of the natural rubber latex to a solid content of the acrylic emulsion (natural rubber/acrylic resin) is from 50/50 to 15/85. An amount of the antifreezing agent is from 100 to 300 parts by mass per 100 parts by mass of a total of the solid content of the natural rubber latex and the solid content of the acrylic emulsion. The total of the solid content of the natural rubber latex and the solid content of the acrylic emulsion is from 20 to 40 mass % of a total mass of the tire puncture sealant.

4 Claims, No Drawings

TIRE PUNCTURE SEALANT

TECHNICAL FIELD

The present invention relates to a tire puncture sealant.

BACKGROUND

Conventionally, a sealing agent for tire punctures has been proposed in which an acrylic emulsion and/or a fatty acid salt having from 9 to 18 carbons among surfactants is used as a base of a stabilizer for a natural rubber latex in place of ammonia in order to prevent the solidification of the natural rubber latex in a valve and suppress the generation of irritating odors without lowering sealing performance below a necessary standard level. In this sealing agent for tire punctures, an acrylic emulsion and/or a fatty acid salt having from 9 to 18 carbons among surfactants is added to a mixed liquid (in which terpene resin as a tackifier and ethylene glycol as an antifreezing agent are added to a natural rubber latex) as a stabilizer for stabilizing the natural rubber latex (Patent Document 1).

PRIOR ART DOCUMENTS

Patent Documents

Patent Document 1: Japanese Unexamined Patent Application Publication No. 2000-272022A

SUMMARY OF THE INVENTION

Problem to be Solved by the Invention

However, the present inventors discovered that with a tire puncture sealant including a natural rubber latex, an antifreezing agent, and an acrylic emulsion, in cases where a mass ratio of a solid content of the natural rubber latex to a solid content of the acrylic emulsion (natural rubber/acrylic resin) is outside a specific range, it is impossible to achieve both sealing performance and storage performance.

Therefore, an object of the present invention is to provide a tire puncture sealant whereby both sealing performance and storage performance can be achieved.

Means of Solving the Problem

As a result of diligent research into a solution for the problems described above, the present inventors discovered that both sealing performance and storage performance can be achieved with a tire puncture sealant that includes a natural rubber latex, an antifreezing agent, and an acrylic emulsion, in which a mass ratio of a solid content of the natural rubber latex to a solid content of the acrylic emulsion (natural rubber/acrylic resin) is from 50/50 to 15/85; an amount of the antifreezing agent is from 100 to 300 parts by mass per 100 parts by mass of a total of the solid content of the natural rubber latex and the solid content of the acrylic emulsion; and the total mass of the solid content of the natural rubber latex and the solid content of the acrylic emulsion is from 20 to 40 mass % of a total mass of the tire puncture sealant. Thus, the present inventors arrived at the present invention.

Specifically, the present invention provides the following 1 to 6.

1. A tire puncture sealant including a natural rubber latex, an antifreezing agent, and an acrylic emulsion; wherein a mass ratio of a solid content of the natural rubber latex to a solid content of the acrylic emulsion (natural rubber/acrylic resin) is from 50/50 to 15/85, an amount of the antifreezing agent is from 100 to 300 parts by mass per 100 parts by mass of a total of the solid content of the natural rubber latex and the solid content of the acrylic emulsion, and the total mass of the solid content of the natural rubber latex and the solid content of the acrylic emulsion is from 20 to 40 mass % of a total mass of the tire puncture sealant.

2. The tire puncture sealant described in 1, wherein a glass transition temperature of the acrylic resin is not greater than 0° C., and said acrylic resin is a polymer obtained from a monomer including a (meth)acrylic acid alkyl ester having not less than two alkyl carbons.

3. The tire puncture sealant described in 1 or 2, wherein the antifreezing agent is at least one type selected from the group consisting of ethylene glycol, propylene glycol, and diethylene glycol.

4. The tire puncture sealant described in any one of 1 to 3, further including a surfactant.

5. The tire puncture sealant described in 4, wherein an amount of the surfactant is from 0.5 to 12 parts by mass per 100 parts by mass of the solid content of the natural rubber latex.

6. The tire puncture sealant described in any one of 1 to 5 that is substantially free of a tackifier.

Effect of the Invention

Both sealing performance and storage performance can be achieved with the tire puncture sealant of the present invention.

DETAILED DESCRIPTION

The present invention is described in detail below.

A tire puncture sealant of the present invention includes: a natural rubber latex, an antifreezing agent, and an acrylic emulsion. A mass ratio of a solid content of the natural rubber latex to a solid content of the acrylic emulsion (natural rubber/acrylic resin) is from 50/50 to 15/85. An amount of the antifreezing agent is from 100 to 300 parts by mass per 100 parts by mass of a total of the solid content of the natural rubber latex and the solid content of the acrylic emulsion. The total mass of the solid content of the natural rubber latex and the solid content of the acrylic emulsion is from 20 to 40 mass % of a total mass of the tire puncture sealant.

Natural Rubber Latex

The natural rubber latex included in the tire puncture sealant of the present invention is not particularly limited, provided that it is a latex that includes natural rubber as a solid content. An example of a preferable form thereof is natural rubber latex from which proteins have been removed (known as "deproteinized natural rubber latex"). If a protein content of the natural rubber latex is low, it is possible to reduce an amount of ammonia produced and, as a result, corrosion damage to steel cords and the generation of irritating odors caused by ammonia can be prevented.

Specific examples of the natural rubber latex include Deproteinized Natural Rubber Latex (SeLatex series, manufactured by SRI Hybrid Ltd.), Deproteinized Natural Rubber Latex (Hytex HA, manufactured by Fulflex, Inc. and available from Nomura Trading Co., Ltd.), Ultra-low Ammonia Natural Rubber Latex (ULACOL, manufactured by Regitex Co., Ltd.), and the like.

A single natural rubber latex can be used alone or a combination of two or more natural rubber latices can be used.

Acrylic Emulsion

The acrylic emulsion included in the tire puncture sealant of the present invention is not particularly limited, provided that it is an emulsion that includes acrylic resin as a solid content. Examples thereof include conventionally known products. Note that in the present invention, "acrylic resin" refers to an acrylic resin and/or a methacrylic resin. The acrylic resin may be either a homopolymer or a copolymer. The acrylic resin may also be a copolymer obtained from an acrylic monomer and a methacrylic monomer.

Of these, from the perspective of obtaining superior sealing performance and storage performance, the acrylic resin is preferably a polymer obtained from a monomer including a (meth)acrylic acid alkyl ester having not less than two alkyl carbons.

The number of alkyl carbons is preferably from 2 to 10.

From the perspective of obtaining superior sealing performance and storage performance, the (meth)acrylic acid alkyl ester having not less than two alkyl carbons is preferably a methacrylate such as ethyl methacrylate, propyl methacrylate, butyl methacrylate, hexyl methacrylate, cyclohexyl methacrylate, nonyl methacrylate, and lauryl methacrylate; or an acrylate such as butyl acrylate, hexyl acrylate, and 2-ethylhexyl acrylate.

In addition to the (meth)acrylic ester, as necessary, the monomer can include at least one type selected from the group consisting of methyl (meth)acrylate, (meth)acrylate, an aromatic vinyl monomer, an unsaturated nitrile, a conjugate diolefin, a multifunctional vinyl monomer, an amide monomer, a hydroxy group-containing monomer, a caprolactone-added monomer, an amino group-containing monomer, a glycidyl group-containing monomer, an acidic monomer, and a vinyl monomer.

From the perspective of obtaining superior sealing performance and storage performance, the acrylic resin preferably is a (meth)acrylic acid ester copolymer or a (meth)acrylic acid copolymer. Examples of the (meth)acrylic acid ester copolymer include (meth)acrylic acid alkyl ester copolymers, and specifically include methyl (meth)acrylate copolymers and ethyl (meth)acrylate copolymers.

From the perspective of obtaining superior sealing performance and storage performance, a weight average molecular weight of the acrylic resin included in the acrylic emulsion is preferably from 10,000 to 500,000 and more preferably from 50,000 to 200,000.

From the perspective of obtaining superior sealing performance, a glass transition temperature of the acrylic resin is preferably not greater than 0° C. and more preferably is from −70 to −10° C.

A production method of the acrylic emulsion is not particularly limited. Examples thereof include a method wherein the monomer is emulsion polymerized using an emulsifying dispersing agent.

A single acrylic emulsion can be used alone or a combination of two or more acrylic emulsions can be used.

In the present invention, the mass ratio of the solid content of the natural rubber latex to the solid content of the acrylic emulsion (natural rubber/acrylic resin) is from 50/50 to 15/85. When the mass ratio is within this range, sealing performance and storage performance will be superior. From the perspective of obtaining superior sealing performance and storage performance, the natural rubber/acrylic resin (mass ratio) is preferably from 40/60 to 20/80.

In the present invention, the total mass of the solid content of the natural rubber latex and the solid content of the acrylic emulsion (natural rubber+acrylic resin) is from 20 to 40 mass % of the total mass of the tire puncture sealant. When the total mass is within this range, sealing performance and storage performance will be superior. From the perspective of obtaining superior sealing performance and storage performance, the total mass of the natural rubber and the acrylic resin is from 25 to 30 mass % of the total mass of the tire puncture sealant.

Antifreezing Agent

The antifreezing agent included in the tire puncture sealant of the present invention is not particularly limited. Examples thereof include ethylene glycol, propylene glycol, diethylene glycol, glycerin, methanol, ethanol, isopropyl alcohol, and the like. Of these, from the perspective of obtaining sealing performance and storage performance at low temperatures, ethylene glycol, propylene glycol, and diethylene glycol, are preferable. A single antifreezing agent may be used alone or a combination of two or more antifreezing agents may be used.

In the present invention, the amount of the antifreezing agent is from 100 to 300 parts by mass per 100 parts by mass of the total of the solid content of the natural rubber latex and the solid content of the acrylic emulsion (natural rubber+acrylic resin). When the amount is within this range, sealing performance and storage performance will be superior and antifreezing properties will be superior. From the perspectives of obtaining superior sealing performance and storage performance and also obtaining superior antifreezing properties, the amount of the antifreezing agent is preferably from 100 to 200 parts by mass and more preferably from 100 to 150 parts by mass per 100 parts by mass of the total of the solid content of the natural rubber latex and the solid content of the acrylic emulsion.

Surfactant

The tire puncture sealant of the present invention can further include a surfactant. It is preferable that the tire puncture sealant of the present invention further includes the surfactant because sealing performance and storage performance will be superior.

The surfactant is not particularly limited and examples thereof include nonionic, anionic, cationic, and amphoteric ionic surfactants.

Examples of the nonionic surfactant include polyoxyethylene alkyl ether, polyoxyethylene alkyl phenyl ether, polyoxyethylene alkylamine, polyoxyethylene alkylamide, polyoxyethylene fatty acid ester, polyoxyethylene castor oil, polyoxyethylene fatty acid diester, polyoxyethylene rosin ester, polyoxyethylene lanolin ether, polyoxyethylene polyhydric alcohol ether, polyoxyethylene polyhydric alcohol fatty acid ester, polyhydric alcohol fatty acid ester, fatty acid alkanolamide, and the like nonionic surfactants. An HLB of the nonionic surfactant is preferably from 12.0 to 19.0.

Examples of the polyoxyethylene alkyl ether include polyoxyethylene decyl ether, polyoxyethylene lauryl ether, polyoxyethylene cetyl ether, polyoxyethylene stearyl ether, polyoxyethylene oleyl ether, polyoxyethylene 2-ethylhexyl ether, polyoxyethylene isodecyl ether, polyoxyethylene tridecyl ether, polyoxyethylene isostearyl ether, and the like.

Examples of the anionic surfactant include alkyl sulfates (e.g. sodium lauryl sulfate), alkyl ether sulfates, polyoxyethylene alkyl ether sulfates, polyoxyethylene alkyl phenyl ether sulfates, alkylbenzene sulfonates, alkylnaphthalene sulfonates, salts of higher fatty acids (soaps), α-sulfo fatty acid methyl ester salts, α-olefin sulfonates, alkane sulfonates, (mono) alkyl phosphates, polyoxy-mono and di-styryl phenylether monoester sulfosuccinates, and alkyl phenoxy polyoxyethylene propyl sulfonates.

Examples of the cationic surfactant include tetraalkyl ammonium chloride, trialkyl benzyl ammonium chloride, alkylamines, monooxyethylene alkylamines, polyoxyethylene alkylamines, and the like.

A single surfactant may be used alone or a combination of two or more surfactants may be used.

An example of a preferable form of a combination of the surfactants is one in which a nonionic surfactant and an anionic surfactant are combined because, in such a form, sealing performance and storage performance will be enhanced.

From the perspective of obtaining superior sealing performance and storage performance, the amount of the surfactant (the total amount when surfactants are combined) is preferably from 0.5 to 12 parts by mass and more preferably from 1.0 to 6.0 parts by mass per 100 parts by mass of the solid content of the natural rubber latex.

Tackifier

An example of a preferable form of the tire puncture sealant of the present invention is one that is substantially free of a tackifier because, in such a form, sealing performance and storage performance will be superior.

In the present invention, "substantially free of a tackifier" means that a content of a tackifier is from 0 to 12 parts by mass per 100 parts by mass of the total of the solid content of the natural rubber latex and the solid content of the acrylic emulsion (natural rubber+acrylic resin).

Specific examples of the tackifier include rosin resins such as rosin esters, polymerized rosin esters, modified rosins, and the like; terpene resins such as terpene phenols, terpene glycols, aromatic terpenes, and the like; hydrogenated terpene resins (terpene resins to which hydrogen has been added); phenolic resins; xylene resins; and the like. A single tackifier may be used alone or a combination of two or more tackifiers may be used.

Other Components

In addition to the components mentioned above, the tire puncture sealant of the present invention can optionally contain additives such as viscosity modifiers, gelling agents, fillers, antiaging agents, antioxidants, pigments, plasticizers, thixotropic agents, UV absorbents, flame retardants, surfactants other than those mentioned above (including leveling agents), dispersants, dehydrating agents and antistatic agents.

Water can be used as the viscosity modifier. The viscosity modifier is not particularly limited so long as it is clean water, but is preferably deionized water, and more preferably distilled water. The viscosity modifier can adjust the viscosity of the tire puncture sealant to an appropriate value and suppress declines in sealing performance.

A method of manufacturing the tire puncture sealant of the present invention is not particularly limited. For example, a method in which the natural rubber latex, the antifreezing agent, the acrylic emulsion, and, optionally, the surfactant and additives are placed in a reaction vessel and then sufficiently kneaded under reduced pressure using a mixing machine such as a mixer, or the like.

When manufacturing the tire puncture sealant of the present invention, it is preferable to keep an increase in a temperature of the system, from before to after adding the antifreezing agent, to 10° C. or less when adding the antifreezing agent (especially when adding a glycol-based compound) to a mixed system that contains the natural rubber latex. In cases where the increase in temperature is kept to within 10° C., gel production of the natural rubber latex can be effectively suppressed.

The viscosity of the tire puncture sealant of the present invention, measured immediately after production using a BL type viscometer (No. 1 rotor) at 20° C., is preferably from 25 to 150 mPa·s and more preferably from 25 to 110 mPa·s.

Next, a method of using the tire puncture sealant of the present invention will be described. However, the method of using the tire puncture sealant of the present invention is not limited to the following method.

First, the tire puncture sealant of the present invention is injected into a tire via the air-filling part of the tire. The method for injecting the tire puncture sealant of the present invention into the tire is not particularly limited, and it is possible to use a conventionally known method, for example, a method involving use of a syringe or a spray. An amount of the tire puncture sealant injected into the tire is not particularly limited and is selected as appropriate according to, for example, the size of the puncture hole.

Next, the tire is filled with air until a predetermined air pressure is reached.

The vehicle is then driven. Aggregates of natural rubber particles and the like are formed by compressive forces and shear forces exerted when the tire rotates and comes into contact with the ground, thereby enabling sealing of the puncture hole.

WORKING EXAMPLES

The present invention is described below in detail using working examples but the present invention is not limited to these examples.

Evaluation

The tire puncture sealants obtained as described below were evaluated for sealing performance and storage performance according to the methods described below. The results are shown in Table 1.

1. Sealing Performance

Sealing performance was evaluated for a center groove portion and a shoulder groove portion of a tire according to the following test methods.

"Excellent sealing performance" refers to excellent sealing performance in the center groove portion and/or the shoulder groove portion.

(1) Evaluation Method and Evaluation Standards for Center Groove Portion Sealing Performance A puncture hole (4 mm in diameter) was made in the center groove portion of a tread of a tire.

Next, the punctured tire was mounted on a drum tester, the tire puncture sealant was injected via a tire valve and the tire was then filled with air until the pressure inside the tire reached 250 kPa.

The tire was then driven for eight minutes at a speed of 30 km/h under a load of 350 kg, after which a presence or absence of air seepage was confirmed both visually and by spraying soapy water in the vicinity of the puncture hole.

If there was no air seepage, the center groove portion sealing performance was evaluated as "excellent" ("○"); if there was no air seepage immediately after the spraying but a few (2 to 9) minutes later there was air seepage, the center groove portion sealing performance was evaluated as "low" ("Δ"); and if there was air seepage, the center groove portion sealing performance was evaluated as "poor" ("×").

(2) Evaluation Method and Evaluation Standards for Shoulder Groove Portion Sealing Performance A puncture hole (4 mm in diameter) was made in the shoulder groove portion of the tread of a tire.

Next, the punctured tire was mounted on a drum tester, the tire puncture sealant was injected via the tire valve and the tire was then filled with air until the pressure inside the tire reached 200 kPa.

The tire was then subjected to intermittent driving, in which the tire was repeatedly driven for one minute at a speed of 30 km/h under a load of 350 kg and then stopped, until there was no air seepage observed when evaluated as described above.

When evaluating the results of this procedure, the shoulder groove portion sealing performance was evaluated as "extremely excellent" ("●") if air seepage ceased after carrying out the intermittent running from 1 to 10 times; "excellent" ("○") if air seepage ceased after carrying out the intermittent running from 11 to 15 times; "somewhat poor" ("Δ") if air seepage ceased after carrying out the intermittent running from 16 to 20 times; and "poor" ("×") if air seepage had not ceased after carrying out the intermittent running 21 or more times.

2. Storage Performance

Storage performance was evaluated according to storage stability and viscosity stability after a vibration test, and was determined according to the following test/evaluation methods.

"Excellent storage performance" refers to excellent storage stability and viscosity stability after a vibration test.

(1) Vibration Test Method

The tire puncture sealant was placed in a container. Following nitrogen substitution, the container was sealed and then subjected to vibrations of a frequency of 20 Hz and an amplitude of ±3 mm for seven days at a temperature of 80° C.

(2) Evaluation Method and Evaluation Standards for Storage Stability

A condition of the tire puncture sealant was observed immediately after the vibration test.

The state of dispersion was observed visually, and if there was no precipitation/separation, storage stability was evaluated as "excellent" ("○"); if there were no aggregates or films in the liquid but there were particles deposited on a surface of the vessel (container), storage stability was evaluated as "low" ("Δ"); and if there were aggregates or films, storage stability was evaluated as "poor" ("×").

(3) Evaluation Method and Evaluation Standards for Viscosity Stability

Immediately before and immediately after the vibration test, viscosity was measured at 20° C. using a BL type viscometer (No. 2 rotor, 60 rpm).

The viscosity stability was evaluated as "excellent" ("○") if the post-vibration viscosity was less than 25% higher than the pre-vibration viscosity; evaluated as "somewhat poor" ("Δ") if the post-vibration viscosity was at least 25% but less than 50% higher than the pre-vibration viscosity; and evaluated as "poor" ("×") if the post-vibration viscosity was at least 50% higher than the pre-vibration viscosity. Note that the pre-vibration viscosity (unit: mPa·s) is shown in the physical properties section of Table 1.

Manufacturing of the Tire Puncture Sealant

The components listed in Table 1 were blended using a mixer according to the amounts (parts by mass) indicated in Table 1 so as to obtain the tire puncture sealants.

Regarding the amount of the natural rubber latex, the upper value is the amount of the natural rubber latex and the lower value in parentheses is the amount of the natural rubber (solid content in the natural rubber latex). The same is true for the acrylic emulsion.

"Solid content (mass %)" refers to a content ratio (unit: mass %) of the total of the solid content of the natural rubber latex to the solid content of the acrylic emulsion (natural rubber+acrylic resin) in the (entire) tire puncture sealant.

TABLE 1

| | | | Working Examples | | | Comparative Examples | | | | Working Example | Comparative Example |
|---|---|---|---|---|---|---|---|---|---|---|---|
| | | | 1 | 2 | 3 | 1 | 2 | 3 | 4 | 4 | 5 |
| Main components | NR latex 1 | | 25 (15) | 50 (30) | 83 (50) | 17 (10) | | 150 (90) | 200 (100) | 83 (50) | 50 (30) |
| | Acrylic emulsion 1 (Tg = −70° C.) | | 163 (85) | 135 (70) | 96 (50) | 184 (90) | 200 (100) | 19 (10) | | 96 (50) | 135 (70) |
| | Acrylic emulsion 2 (Tg = −10° C.) | | | | | | | | | | |
| | Acrylic emulsion 3 (Tg = 50° C.) | | | | | | | | | | |
| | Tackifier resin emulsion 1 | | | | | | | | | | |
| Antifreezing agent 1 | Propylene glycol | | 110 | 110 | 110 | 110 | 110 | 110 | 110 | 300 | 400 |
| Antifreezing agent 2 | Ethylene glycol | | | | | | | | | | |
| Surfactants | Nonionic | POE lauryl ether | 0.075 | 0.150 | 0.249 | 0.051 | 0.000 | 0.450 | 0.600 | 0.249 | 0.150 |
| | Anionic | SDS | 0.750 | 1.500 | 2.490 | 0.510 | 0.000 | 4.500 | 6.000 | 2.490 | 1.500 |
| Viscosity modifier | | | 12 | 12 | 12 | 12 | 12 | 12 | 12 | 12 | 12 |
| Physical properties | Solid content (mass %) | | 31.3 | 32.1 | 33.1 | 31.8 | 31.1 | 35.3 | 38.5 | 20.4 | 16.6 |
| | Viscosity (at 20° C., mPa·s) | | 58 | 52.5 | 48 | 50 | 52.5 | 50 | 50 | 38 | 35 |
| Sealing performance | Center groove portion | | ○ | ○ | ○ | × | Δ | ○ | ○ | ○ | × |
| | Shoulder groove portion | | ○ | ● | ● | × | Δ | ● | ● | ○ | × |
| Storage performance | Storage stability | | ○ | ○ | ○ | ○ | ○ | × | × | ○ | ○ |
| | Viscosity stability | | ○ | ○ | ○ | ○ | ○ | × | × | ○ | ○ |

TABLE 1-continued

|  |  |  | Working Examples | | | | |
|---|---|---|---|---|---|---|---|
|  |  |  | 5 | 6 | 7 | 8 | 9 |
| Main components | NR latex 1 |  | 83 (50) | 83 (50) | 83 (50) | 83 (50) | 50 (30) |
|  | Acrylic emulsion 1 (Tg = −70° C.) |  | 96 (50) |  |  | 96 (50) | 135 (70) |
|  | Acrylic emulsion 2 (Tg = −10° C.) |  |  | 96 (50) |  |  |  |
|  | Acrylic emulsion 3 (Tg = 50° C.) |  |  |  | 96 (50) |  |  |
|  | Tackifier resin emulsion 1 |  |  |  |  |  | 25 (12) |
| Antifreezing agent 1 | Propylene glycol |  | 110 | 110 | 110 |  | 110 |
| Antifreezing agent 2 | Ethylene glycol |  |  |  |  | 110 |  |
| Surfactants | Nonionic | POE lauryl ether | 0.249 | 0.249 | 0.249 | 0.249 | 0.249 |
|  | Anionic | SDS | 2.490 | 2.490 | 2.490 | 2.490 | 2.49 |
| Viscosity modifier |  |  | 6 | 12 | 12 | 12 | 12 |
| Physical properties | Solid content (mass %) |  | 33.1 | 33.1 | 33.1 | 33.1 | 32.9 |
|  | Viscosity (at 20° C., mPa·s) |  | 58 | 52.5 | 48 | 48 | 52.5 |
| Sealing performance | Center groove portion |  | ○ | ○ | ○ | ○ | ○ |
|  | Shoulder groove portion |  | ● | ○ | X | ● | ○ |
| Storage performance | Storage stability |  | ○ | ○ | ○ | ○ | ○ |
|  | Viscosity stability |  | ○ | ○ | ○ | ○ | Δ |

|  |  |  | Comparative Examples | | | | |
|---|---|---|---|---|---|---|---|
|  |  |  | 6 | 7 | 8 | 9 | 10 |
| Main components | NR latex 1 |  | 83 (50) |  | 200 (100) | 116.67 (70) | 83 (50) |
|  | Acrylic emulsion 1 (Tg = −70° C.) |  | 96 (50) | 200 (100) |  | 57.69 (30) | 96 (50) |
|  | Acrylic emulsion 2 (Tg = −10° C.) |  |  |  |  |  |  |
|  | Acrylic emulsion 3 (Tg = 50° C.) |  |  |  |  |  |  |
|  | Tackifier resin emulsion 1 |  |  | 25 (12) | 25 (12) |  |  |
| Antifreezing agent 1 | Propylene glycol |  | 110 | 110 | 110 | 110 | 70 |
| Antifreezing agent 2 | Ethylene glycol |  |  |  |  |  |  |
| Surfactants | Nonionic | POE lauryl ether | 0.249 | 0.000 | 0.600 | 0.35 | 0.249 |
|  | Anionic | SDS | 2.490 | 0.000 | 6.000 | 3.50 | 2.49 |
| Viscosity modifier |  |  | 250 | 12 | 12 | 12 | 0 |
| Physical properties | Solid content (mass %) |  | 18.6 | 31.1 | 38.5 | 33.5 | 40.1 |
|  | Viscosity (at 20° C., mPa·s) |  | 50 | 52.5 | 50 | 58 | 61.5 |
| Sealing performance | Center groove portion |  | X | Δ | ○ | ● | ● |
|  | Shoulder groove portion |  | X | Δ | ○ | ● | ● |
| Storage performance | Storage stability |  | ○ | ○ | X | Δ | Δ |
|  | Viscosity stability |  | ○ | ○ | X | Δ | Δ |

Details of the components shown in Table 1 are as follows.

NR latex 1: Natural rubber latex (Hytex HA, manufactured by Fulflex, Inc. and available from Nomura Trading Co., Ltd.; Solid content =60 mass %)

Acrylic emulsion 1: Emulsion of (meth)acrylic acid ester copolymer (Tg: −70° C.); solid content=60 mass % (trade designation: ADH-893, manufactured by Nissin Chemical Industry Co., Ltd.)

Acrylic emulsion 2: Emulsion of (meth)acrylic acid ester copolymer (Tg: −10° C.); solid content=48 mass % (trade designation: AD-94, manufactured by Nissin Chemical Industry Co., Ltd.)

Acrylic emulsion 3: Emulsion of (meth)acrylic acid ester copolymer (Tg: 50° C.); solid content=50 mass % (trade designation: 2685, manufactured by Nissin Chemical Industry Co., Ltd.)

Tackifier resin emulsion 1: Terpene phenol resin emulsion; solid content=48 mass% (trade designation: R1050, manufactured by Yasuhara Chemical Co., Ltd.); used as a tackifier Antifreezing agent 1: Propylene glycol (manufactured by Adeka Corporation)

Antifreezing agent 2: Ethylene glycol (manufactured by Sankyo Chemical Co., Ltd.)

Viscosity modifier: Water (deionized water)

Surfactant (nonionic, POE lauryl ether): Polyoxyethylene lauryl ether (trade designation: EMULGEN 123P, manufactured by Kao Corporation; HLB=16.9)

Surfactant (anionic, SDS): Sodium lauryl sulfate (trade designation: Emal 10PT, manufactured by Kao Corporation)

As is clear from the results shown in Table 1, sealing performance was poor in Comparative Example 1, in which the ratio of the natural rubber was less than the 15/85 natural rubber/acrylic resin ratio; and in Comparative Example 2, in which the natural rubber latex was not included. Storage performance was poor in Comparative Examples 3 and 9, in which the ratio of the natural rubber was greater than the 50/50 natural rubber/acrylic resin ratio; and in Comparative Example 4, in which the acrylic emulsion was not included. Sealing performance was poor in Comparative Example 5, in which the amount of the antifreezing agent exceeded 300 parts by mass per 100 parts by mass of the total of the solid content of the natural rubber latex and the solid content of the acrylic emulsion. Additionally, sealing performance was poor in Comparative Example 6, in which the total mass of the solid content of the natural rubber latex and the solid content of the acrylic emulsion (natural rubber+acrylic resin) was less than 20 mass % of the total mass of the tire puncture sealant. Sealing performance was poor in Comparative Example 7, in which the natural rubber latex was not included and a tackifier was included. Storage performance was poor in Comparative Example 8, in which the acrylic emulsion was not included and a tackifier was included. Moreover, storage performance was poor in Comparative Example 10, in which the total mass of the solid content of the natural rubber latex and the solid content of the acrylic emulsion exceeded 40 mass % of the total mass of the tire puncture sealant.

In contrast, sealing performance and storage performance were superior in Working Examples 1 to 9 and both sealing performance and storage performance were achieved.

Additionally, in cases where the glass transition temperature of the acrylic resin in the acrylic emulsion was not greater than 0° C. (Working Examples 1 to 6, 8 and 9), sealing performance was superior compared to Working Example 7, in which the glass transition temperature exceeded 0° C.

In cases where the mass ratio of the solid content of the natural rubber latex to the solid content of the acrylic emulsion (natural rubber/acrylic resin) was from 40/60 to 20/80 (Working Examples 2 and 3), sealing performance was superior compared to Working Example 1.

In cases where the amount of the antifreezing agent was from 100 to 200 parts by mass per 100 parts by mass of the total of the solid content of the natural rubber latex and the solid content of the acrylic emulsion (Working Example 3), sealing performance was superior compared to Working Example 4.

In cases where a tackifier was not included (Working Example 3), sealing performance and storage performance were superior compared to Working Example 9.

As described above, the tire puncture sealant of the present invention has not only superior sealing performance, but also superior storage performance, and can exhibit superior sealing performance even after being kept in a vehicle for a long period of time.

What is claimed is:

1. A tire puncture sealant comprising a natural rubber latex, an antifreezing agent, a surfactant, and an emulsion including an acrylic resin; wherein
the tire puncture sealant is substantially free of a tackifier,
a mass ratio of a solid content of the natural rubber latex to a solid content of the emulsion (natural rubber/acrylic resin) is from 50/50 to 15/85,
an amount of the antifreezing agent is from 100 to 300 parts by mass per 100 parts by mass of a total of the solid content of the natural rubber latex and the solid content of the emulsion,
a total mass of the solid content of the natural rubber latex and the solid content of the emulsion is from 20 to 40 mass % of a total mass of the tire puncture sealant, and
wherein a glass transition temperature of the acrylic resin is not greater than 0° C.,
said acrylic resin is a polymer obtained from a monomer selected from the group consisting of a (meth)acrylic acid alkyl ester having not less than two alkyl carbons and optionally one or more additional monomers selected from the group consisting of methyl (meth)acrylate, and
the surfactant includes at least one anionic surfactant selected from the group consisting of alkyl sulfates, alkyl ether sulfates, polyoxyethylene alkyl ether sulfates, polyoxyethylene alkyl phenyl ether sulfates, alkylbenzene sulfonates, alkylnaphthalene sulfonates, α-sulfo fatty acid methyl ester salts, α-olefin sulfonates, alkane sulfonates, polyoxy-mono and di-styryl phenylether monoester sulfosuccinates, and alkyl phenoxy polyoxyethylene propyl sulfonates.

2. The tire puncture sealant according to claim 1, wherein the antifreezing agent is at least one type selected from the group consisting of ethylene glycol, propylene glycol, and diethylene glycol.

3. The tire puncture sealant according to claim 1, wherein an amount of the surfactant is from 0.5 to 12 parts by mass per 100 parts by mass of the solid content of the natural rubber latex.

4. The tire puncture sealant according to claim 1, which consists essentially of the natural rubber latex, the antifreezing agent, the surfactant, the emulsion including an acrylic resin, and optionally at least one additive selected from the group consisting of a viscosity modifier, a gelling agent, a filler, an antiaging agent, an antioxidant, a pigment, a plasticizer, a thixotropic agent, a UV absorbent, a flame retardant, a surfactant other than said at least one anionic surfactant, a dispersant, a dehydrating agent, and an antistatic agent.

* * * * *